No. 816,779. PATENTED APR. 3, 1906.
H. M. CHEEK.
FASTENING STUD.
APPLICATION FILED NOV. 29, 1905.
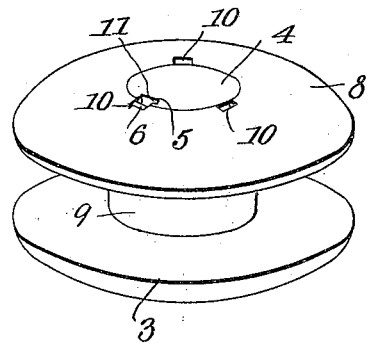
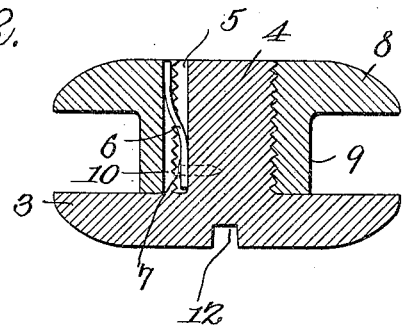
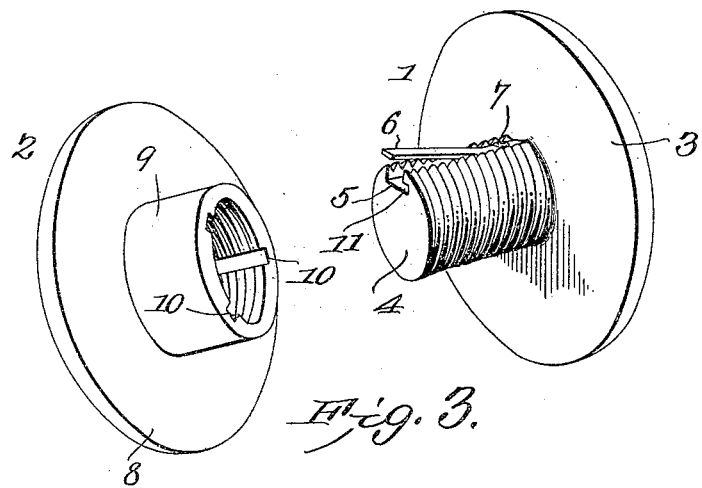
Witnesses:
Henry M. Cheek,
Inventor,
Attorneys.

UNITED STATES PATENT OFFICE.

HENRY M. CHEEK, OF PLEASANT PLAINS, ARKANSAS.

FASTENING-STUD.

No. 816,779.  Specification of Letters Patent.  Patented April 3, 1906.

Application filed November 29, 1905. Serial No. 289,638.

*To all whom it may concern:*

Be it known that I, HENRY MONROE CHEEK, a citizen of the United States, residing at Pleasant Plains, in the county of Independence and State of Arkansas, have invented a new and useful Fastening-Stud, of which the following is a specification.

This invention relates generally to fastening-studs, and more particularly to one of that class adapted for securing together plies of leather, such as stirrup-leathers, bridle-straps, mill-belts, and the like.

The object of the invention is in a ready, simple, and practical manner to dispense with the upsetting of rivets in securing plies of leather or other material together, to facilitate separation of the assembled material without marring or injuring the fastening-studs, and to facilitate the securing together of two or more plies of leather or the like.

With the above and other objects in view, as will appear as the nature of the invention is better understood, the same consists in the novel construction and combination of parts of a fastening-stud, as will be hereinafter fully described and claimed.

In the accompanying drawings, forming a part of this specification, and in which like characters of reference indicate corresponding parts, Figure 1 is a view in perspective of a fastening-stud as it appears when the parts are assembled. Fig. 2 is a vertical longitudinal section through the stud. Fig. 3 is a perspective detail view exhibiting the parts of the stud detached.

The stud embodies a bolt member 1 and a nut member 2. The bolt member embodies a head 3 and a threaded shank 4, the latter being provided with a longitudinal channel 5, in which is arranged a spring 6, the inner end of which or that adjacent to the head being secured in the channel by a rivet or screw 7. The nut member embodies a head 8 and an internally-threaded sleeve 9, the sleeve being provided with a series of channels 10, in this instance three, any one of which is adapted to be engaged by the spring 6 when the parts of the stud are assembled, as shown in Fig. 2, thus to hold the nut member securely combined with the bolt member against possibility of accidental separation. In order to hold the spring inward beyond the plane of the threads of the shank when the nut member is being positioned or removed, the channel 5 is provided with a lateral notch 11, into which the outer terminal of the spring is adapted to be sprung, the tendency of the spring normally to extend beyond the shank, as shown in Fig. 3, operating to hold it firmly in engagement with the walls of the notch. After the nut member has been seated the spring is thrown out of engagement with the notch, thereupon engaging one of the channels 10.

In securing two plies of leather or the like together holes are first provided through which the sleeve is inserted, and the bolt member is then combined with the nut member, the former being provided in its head with a nick 12 to be engaged by a suitable implement in securing the two members of the stud together. During this procedure the spring will be in locked engagement with the notch; but as soon as the nut has been properly seated it is released and thereupon engages one of the channels, and thus locks the two members in their adjusted positions. It will be seen that when the bolt member is finally adjusted relatively to the nut member accidental separation of the parts will be positively precluded. When the members are to be separated, the reverse of the operation thus described takes place.

I claim—

A fastening-stud comprising a bolt member embodying a head and a threaded shank provided with a longitudinal channel having a lateral notch, a spring secured at one end in the channel and adapted to be moved into engagement with the notch to hold the spring within the plane of the threads, and a nut member provided with an internally-threaded sleeve having a plurality of longitudinal channels to be engaged by the spring to hold it at any desired adjustment relatively to the shank.

In testimony that I claim the foregoing as my own I have hereto affixed my signature in the presence of two witnesses.

HENRY M. CHEEK.

Witnesses:
W. R. WESTBROOK,
J. E. JOHNSTON.